April 1, 1958 J. PISCHKE ET AL 2,828,537
METHOD OF PRODUCING ARMOURED SYNTHETIC PLASTIC
TUBES, VESSELS OR SHAPED PIECES
Filed Jan. 25, 1954 2 Sheets-Sheet 1

INVENTORS
Johannes Pischke and
Franz Primessing
BY
Michael S. Striker
Attorney

INVENTORS
Johannes Pischke and
Franz Primessing
BY
Michael S. Striker
Attorney

United States Patent Office 2,828,537
Patented Apr. 1, 1958

2,828,537

METHOD OF PRODUCING ARMOURED SYNTHETIC PLASTIC TUBES, VESSELS OR SHAPED PIECES

Johannes Pischke, Troisdorf, and Franz Primessing, Mondorf am Rhine, Germany, assignors to Dynamit Actien Gesellschaft vormals Alfred Nobel & Co., Troisdorf, Germany Application January 25, 1954, Serial No. 406,072

3 Claims. (Cl. 29—517)

This invention relates to tubes, vessels, shaped pieces and the like of synthetic plastics which are armoured with a jacket of a material of greater strength, and to a method of producing the same.

It is known to armour metal tubes with tubes of synthetic plastics, in order thereby to ensure the resistance of the tube to corrosion. For this purpose it has already been proposed to insert in the metal tube a synthetic plastic tube having a slightly smaller outer diameter than the inside diameter of the metal tube, and then to press the plastic tube against the metal tube by the application of internal elevated pressure and heat.

In this method it is further known to roughen the metal tube on the inside and to provide it with an adhesive layer by which a foil of synthetic plastic introduced and cut to shape is then pressed and joined by internal gas or liquid pressure. Instead of using a gas or liquid pressure it has also already been proposed to expand the synthetic plastic tube by mechanical means or by such means to bring it to bear against the inside wall of the metal tube, a stepped piston being passed through the plastic tube with the interposition of a rubber tube and the pressure being transmitted from said rubber tube to the synthetic plastic tube.

In all these methods, the metal tube remains unchanged, while only the synthetic plastic tube is widened from inside to the diameter of the metal tube. This connection however is not dependable even when adhesive means are also used, in cases where large fluctuations of temperature must be dealt with, because the coefficient of expansion of the synthetic plastic tube is greater than that of the metal tube and consequently tensile stresses occur in the plastic tube on cooling, particularly when adhesive media are used. If, however, no adhesive is used, the synthetic plastic tube will become detached from the wall of the metal tube, so that the connection is destroyed.

In an attempt to avoid these difficulties, it has also already been proposed to work up the metal tube together with the inserted synthetic plastic tube by the known drawing method, by passing the tube through a die the aperture of which is so dimensioned that the metal tube is contracted tightly about the synthetic plastic tube. This proposal, however, cannot lead to success because given suitable dimensions of the drawing die at the most tangential pressure, stresses can be produced. This also results in the disadvantage that in the drawing process not only the metal tube but also the synthetic plastic tube is strained through the resulting friction and thus stretched in the axial direction. This produces axial tensile stresses in the plastic tube, to which synthetic plastics are known to be particularly sensitive.

It is an object of the present invention to overcome the foregoing disadvantages and to this end consists in bringing the synthetic plastic shaped part in both axes of its surface plane, that is to say in the tangential and axial directions, to a tangential and axial initial pressure stress by means of an armouring, in such manner that even at the lowest temperature of use, for example in the case of hard polyvinyl chloride about minus 20° C. and/or with an internal superatmospheric pressure there will always be a residue of initial pressure stress in these two axes of the synthetic plastic shaped part, for example a synthetic plastic tube.

The initial axial pressure stress of a synthetic plastic tube of this type can for example be produced in manner known per se by compressing a synthetic plastic tube which is introduced into and is longer than a metal armouring tube to the length of the latter by pressure on the end faces in the axial direction and thereby imparting to it an elastic initial tension. The elastic axial initial pressure stress of the synthetic plastic tube is at the same time so proportioned that during the subsequent elongation during the drawing operation the synthetic plastic tube can participate in this elongation and thereby retain an adequate initial pressure stress.

In this way it has been found possible to produce synthetic plastic tubes and shaped parts in which even on intense cooling no gap occurs between the armour and internal tube and the inclusion of air is reliably avoided.

In order to produce the axial and tangential initial pressure stress in the synthetic plastic tube, both the metal and the synthetic plastic tube are advantageously deformed, while this deformation can be effected by means of a nozzle through which the tube assembly is drawn or pressed, or by rolling the armour tube for the purpose of reducing the diameter.

As a further development of the principle of the invention, an expanding material, such as for example a foam material, is introduced between the armour tube and the synthetic plastic tube, which substance produces the desired initial stress on foaming up, with the simultaneous compacting of the foamed material. Tubes of this type are particularly suitable for thermal insulation. According to the invention, the foam materials used are preferably those having a basis of the polyester resins or diisocyanates.

The initial stress can also be produced by embedding between the armouring and a hard synthetic plastic tube a soft compressible mass in such manner that an initial pressure stress is produced in the tube.

The invention will now be described with reference to the accompanying drawings which illustrate diagrammatically and by way of example several embodiments of armoured synthetic plastic tubes and hollow bodies according to the method of the invention, and in which.

Figure 1:
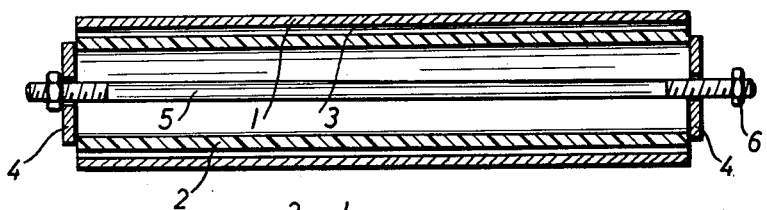
Figs. 1 to 3 show in longitudinal section a tube combination consisting of metal tube and synthetic plastic tube, which are of equal length in the initial state.
Figure 2:
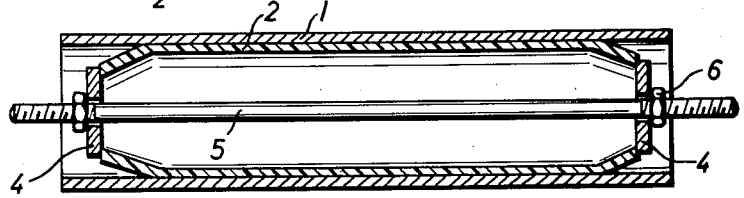
Figure 3:
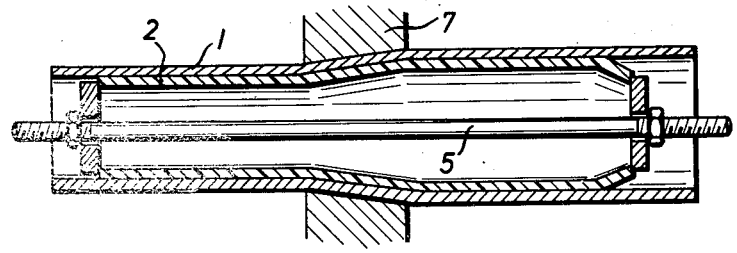

In an armour tube 1 of metal (see Figs. 1 to 3), a synthetic plastic tube 2 of the same length and smaller external diameter than the internal diameter of the armour tube is inserted so as to leave an annular space 3 between the two tubes. On the end faces of the synthetic plastic tube rest pressure plates 4, which can be tightened by tightening nuts 6 screwed by a screw thread on an axial belt 5 passing through the assembly, to such an extent that a corresponding shortening of the synthetic plastic tube is effected while simultaneously the outer walls of the latter are brought to bear against the inner walls of the armour tube 1. This results in axial pressure stresses (see Fig. 2). When the two tubes are driven through a die or nozzle 7 a common reduction of cross-section occurs, whereby the desired tangential pre-stressing in the synthetic plastic tubes is produced.

Figure 4:
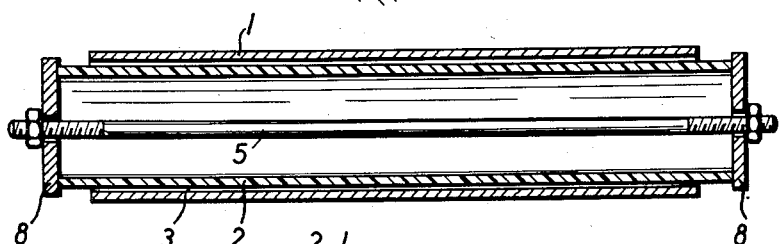
Figs. 4 to 6 show in longitudinal section a tube combination consisting of metal tube and synthetic plastic tube, wherein the latter is longer than the metal tube in the initial state.
Figure 5:
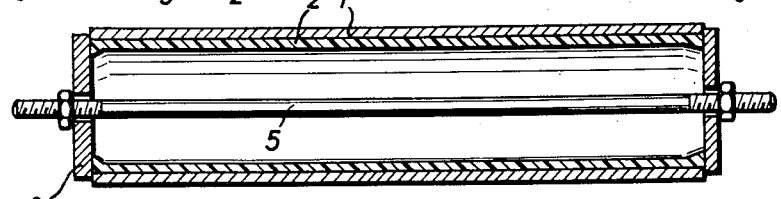
Figure 6:
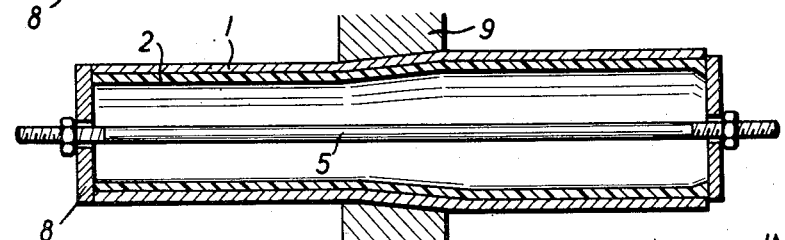

Figs. 4 to 6 show substantially the same arrangement as described above, but with the difference that the synthetic plastic tube 2 is longer than the metal tube 1, and projects on both sides beyond the ends of the latter by a determined amount. This projection is so dimensioned that when end plates 3 bear on the end surface of the metal tube 1 the pressure pre-stressing has brought the synthetic plastic tube surface to bear against the metal jacket. Since the pressure plates 8 are rather larger in diameter than the synthetic plastic tube, they come to bear on the metal tube. The diameter is however limited by the diameter of a drawing die 9, because the entire tube combination together with the end plates must be drawn or pushed therethrough.

Figure 7:
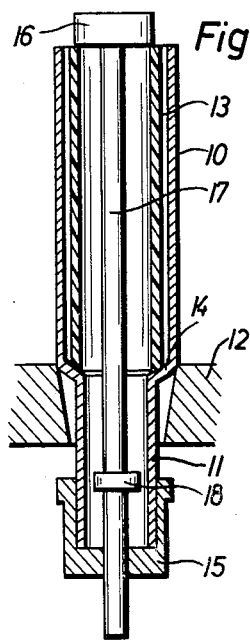
Figs. 7 to 9 show in longitudinal section a tube combination consisting of metal tube and synthetic plastic tube, the former containing a narrowed extension, and the deformation of the two tubes taking place by drawing through a die.
Figure 8:
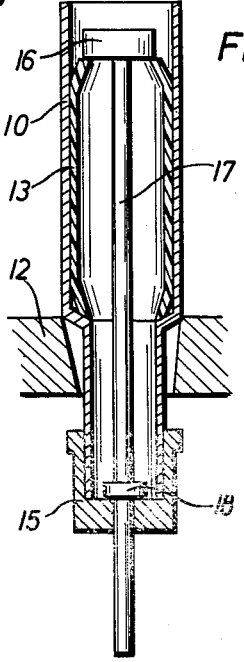
Figure 9:
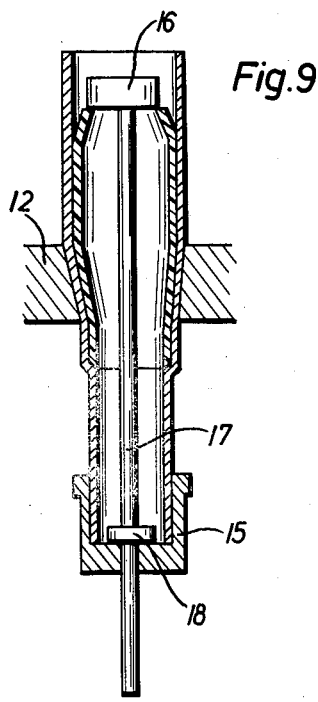

In the embodiment according to Figs. 7 to 9, an armour tube 10 has a narrowed portion 11 which is inserted through die 12. A synthetic plastic tube 13 is supported against a shoulder 14 formed by the narrowed portion 11. The narrowed portion also carries a drawing claw 15. At the side remote from the nozzle the synthetic plastic tube lies flush with the armour tube. A piston 16 serves for clamping and bears against the end face of the synthetic plastic tube, and is drawn by means of a rod 17 in the direction of the die until a stop ring 18 abuts against the drawing claw 15. This distance between the stop ring and the piston is so selected that in the condition illustrated in Fig. 8 the synthetic plastic tube is axially pre-stressed to such an extent that the surfaces of both the tubes bear firmly against one another. In the drawing operation according to Fig. 9 the narrowing of the cross-section of the tube then results in the desired tangential tensile pre-stressing.

Figure 10:
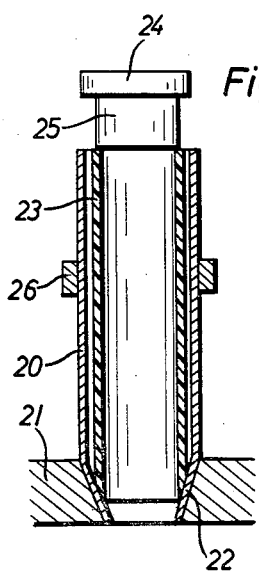
Figs. 10 to 12 show in longitudinal section a tube combination consisting of metal tube and synthetic plastic tube, where the deformation is effected by the fact that the two tubes are pressed through a die by means of a reduced diameter pressure plate.
Figure 11:
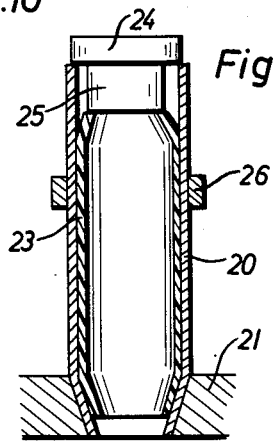
Figure 12:
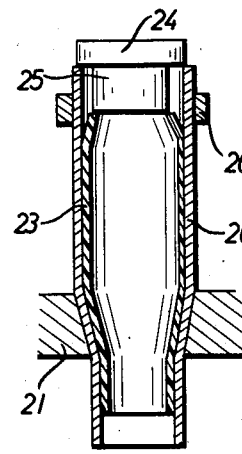

In the example described above, with reference to Figs. 7 to 9, the tube combination was drawn through the nozzle. In the embodiment illustrated in Figs. 10 and 11, the same operation is carried out by pressure. To this end an armour tube 20 is so narrowed in the region of a drawing die or nozzle 21 that it bears on all sides against the die wall 22. The introduction of a synthetic plastic tube 23 is limited by this narrowed portion to such an extent that at the opposite side the metal tube and the synthetic plastic tube lie flush. For the application of the pressure a pressure plate 24 is provided, an extension 25 of which, of smaller diameter, approximately corresponds to the outer diameter of the synthetic plastic tube. The width of the extension is so dimensioned that after introduction into the metal tube the synthetic plastic tube has received the necessary axial pressure pre-stressing. Since the pressure plate 24 now bears against the end face of the metal tube, the entire tube combination now can be pressed through the die 21 by the further application of pressure. A ring 26 is also provided for the purpose of guiding the assembly (see Fig. 12).

The following are given as examples of armoured plastic tubes in accordance with the invention:

(1) A synthetic plastic core tube of polyvinyl chloride is armoured with ordinary commercial steel tubing.

(2) A synthetic plastic core tube of hard polyvinyl chloride is armoured with steel with the interposition of an insulating intermediate layer of a foam of polyester resins and isocyanates. The intermediate foam layer then has the task of thermal insulation.

(3) A synthetic plastic core tube of hard polyvinyl chloride is armoured with ordinary commercial aluminium tube with the interposition of an intermediate layer of, for example, softened polyvinyl chloride. In this combination the synthetic plastic core tube remains undamaged because of the soft intermediate layer even when the aluminium armour undergoes deformations through external influences.

(4) A synthetic plastic core tube of softened polyethylene is armoured with light metal.

In all the above examples, the synthetic plastic core tube is given a slightly smaller diameter than the internal diameter of the armour tube, in order to permit the easy insertion of the tubes in one another before working up. The synthetic plastic core tube can be made relatively thin as regards its wall thickness, because after deformation it is stressed only by tangential pressure, and synthetic plastics of this type are far less sensitive to pressure stresses than to tensile stresses. The combination tube is similarly produced with the aid of an intermediate layer of foam substances by inserting the synthetic plastic tube in the armour tube and then filling the gap with a mixture of suitable polyester resins with isocyanates. The ends of the tube are then sealed and caused to foam up through the mixture, whereby an elevated pressure is produced between the armour and the core, thus providing the core tube in the desired manner with an initial pressure stress.

The present invention has the advantage that even at operating temperatures which lie far below the temperature of manufacture of the armoured synthetic plastic tube, said synthetic plastic core tube bears unchanged firmly against the armour and at any internal pressure, the upper limit of which is given by the permissible stressing of the armour, the synthetic plastic tube undergoes no tensile stresses, while the pressure stresses are taken by the armour. In this way the effect can be achieved that at the highest permissible operating pressure the corrosion resisting synthetic plastic core tube is free from stresses.

We claim:

1. A method of making a hollow composite plastic lined body capable of withstanding low temperatures, comprising the steps of placing an elongated tubular liner of synthetic resilient plastic within a tubular reinforcing jacket of a material having a smaller coefficient of thermal expansion and contraction than said liner; pressing the ends of the liner toward each other sufficiently to shorten permanently the length of the liner and to press the liner outwardly against the jacket; and permanently reducing the diameter of the jacket by pressing the same inwardly sufficiently to deform the jacket and elongate the same together with the liner to an extent which leaves in the finished hollow composite plastic lined body a residual liner stress tending to expand the same sufficiently to prevent said liner from contracting enough to open a gap when the thus-formed hollow composite plastic lined body is cooled to a given temperature.

2. A method of making a hollow composite plastic lined body capable of withstanding low temperatures, comprising the steps of placing an elongated tubular liner of synthetic resilient plastic within a shorter tubular reinforcing jacket of a material stronger than said plastic and having a smaller coefficient of thermal expansion and contraction than said liner; pressing the ends of the liner toward each other sufficiently to shorten permanently the length of the liner and to press the liner outwardly against the jacket; and permanently reducing the diameter of the jacket by pressing the same inwardly to deform the jacket and elongate the same together with the liner to an extent which leaves in the finished hollow composite plastic lined body a residual liner stress tending to expand the same sufficiently to prevent said liner from contracting enough to open a gap when the thus-formed hollow composite plastic lined body is cooled to a given temperature.

3. A method of making a hollow composite plastic lined body capable of withstanding low temperatures, comprising the steps of placing an elongated tubular liner of synthetic resilient plastic within a tubular reinforcing jacket of a material stronger than said plastic and having a smaller coefficient of thermal expansion and contraction than said liner; pressing the ends of the liner toward each other sufficiently to shorten permanently the length of the liner and to expand the liner outwardly against the jacket; and drawing the jacket through a drawing ring small enough to permanently reduce the diameter of the jacket and to elongate the same together with the liner to an extent which leaves in the finished hollow composite plastic lined body a residual liner stress tending to expand the same sufficiently to prevent said liner from contracting enough to open a gap when the thus-formed hollow composite plastic lined body is cooled to a given temperature.

References Cited in the file of this patent

UNITED STATES PATENTS

| | | |
|---|---|---|
| 460,921 | Meyer | Oct. 6, 1891 |
| 1,670,564 | Breer | May 22, 1928 |
| 1,759,780 | Figari | May 20, 1930 |
| 2,104,884 | Quarnstrom | Jan. 11, 1938 |
| 2,198,149 | Bangert | Apr. 23, 1940 |
| 2,216,830 | Roberts | Oct. 8, 1940 |
| 2,371,348 | Murray | Mar. 13, 1945 |
| 2,629,698 | Sterling | Feb. 24, 1953 |

FOREIGN PATENTS

| | | |
|---|---|---|
| 302,963 | Great Britain | Dec. 24, 1928 |